United States Patent [19]

Fitzgerald et al.

[11] Patent Number: 5,791,879
[45] Date of Patent: Aug. 11, 1998

[54] POLY-COMPONENT BLADE FOR A GAS TURBINE

[75] Inventors: John James Fitzgerald, Clifton Park, N.Y.; William Elliott Bachrach, Bennington, Vt.; Wendy Wen-Ling Lin; Scott Roger Finn, both of Schenectady, N.Y.

[73] Assignee: General Electric Company, Schenectady, N.Y.

[21] Appl. No.: 947,730

[22] Filed: Oct. 14, 1997

Related U.S. Application Data

[63] Continuation of Ser. No. 650,278, May 20, 1996, abandoned.

[51] Int. Cl.$^6$ ............................................. F04D 29/38
[52] U.S. Cl. .............................. 416/229 A; 416/229 R
[58] Field of Search ......................... 416/229 A, 229 R, 416/241 R

[56] References Cited

U.S. PATENT DOCUMENTS

| | | | |
|---|---|---|---|
| 2,775,426 | 12/1956 | Barrett, Jr. et al. | 416/229 A |
| 3,318,388 | 5/1967 | Bihlmire | 416/229 R |
| 3,695,778 | 10/1972 | Taylor . | |
| 3,903,578 | 9/1975 | Rothman . | |
| 4,118,147 | 10/1978 | Ellis . | |
| 4,289,449 | 9/1981 | Frister | 416/229 R |
| 4,594,761 | 6/1986 | Murphy et al. . | |
| 4,732,541 | 3/1988 | Hyll | 416/241 A |
| 5,129,787 | 7/1992 | Violette et al. | 416/229 A |
| 5,240,376 | 8/1993 | Velicki | 416/229 A |
| 5,634,771 | 6/1997 | Howard et al. | 416/241 A |
| 5,655,883 | 8/1997 | Schilling | 416/229 A |

FOREIGN PATENT DOCUMENTS

| | | | |
|---|---|---|---|
| 0496550 | 7/1992 | European Pat. Off. . | |
| 80800 | 5/1963 | France | 416/229 R |
| 2559423 | 8/1985 | France . | |
| 2682992 | 4/1993 | France . | |
| 1956885 | 6/1970 | Germany . | |
| 217668 | 6/1941 | Switzerland | 416/229 R |
| 2168111 | 6/1986 | United Kingdom . | |
| 2264755 | 9/1993 | United Kingdom . | |

OTHER PUBLICATIONS

U.S. Patent Application Serial No. 08/257,602, filed May 23, 1994, by Jan C. Schilling, entitled "Unshrouded Blading for High Bypass Turbofan Engines".

U.S. Patent Application Serial No. 08/533,478, filed Sep. 25, 1995, by Howard et al., entitled "Partially-Metallic Blade for a Gas Turbine".

U.S. Patent Application Serial No. 08/533,477, filed Sep. 25, 1995, by Jan C. Schilling, entitled "Hybrid Blade for a Gas Turbine".

"Braiding of Hybrid Composite Propeller Blades", by R.F. J. McCarthy, *Plastics–Metals–Ceramics* edited by H.L. Hornfeld, Switzerland, 1990, pp. 127–142.

"Polymer Composite Applications to Aerospace Equipment", by R.F.J. McCarthy, *Composites Manufacturing* vol. 5, No. 2, 1994, pp. 83–93.

"Fifteen Years Experience with Comosite Propeller Blades", by R. McCarthy, *European Chapter SAMPE International Conference Advanced Technology in Materials Engineering*, Cannes, France, Jan. 12–14, 1981.

"Metal Spar/Superhybrid Shell Comsite Fan Blades", by General Electric Company, Final Report Proposed for NASA under Contract #NAS3-20402.

U.S. Patent Application Serial No. 08/593,757, filed Jan. 29, 1996, by Weiping Wang et al., entitled "Multi–Component Blade for a Gas Turbine".

*Primary Examiner*—John T. Kwon
*Attorney, Agent, or Firm*—Douglas E. Erickson; Marvin Snyder

[57] ABSTRACT

A lightweight, impact-resistant gas turbine blade, such as an aircraft engine fan blade, has an airfoil portion. The airfoil portion includes a metallic section consisting essentially of metal and at least one panel section not consisting essentially of metal. The metallic section extends from generally the blade root to generally the blade tip. Each panel section is an elastomeric section. Preferably, the metallic section and the at-least-one panel section only together define a generally airfoil shape.

11 Claims, 3 Drawing Sheets

POLY-COMPONENT BLADE FOR A GAS TURBINE

This application is a Continuation of application Ser. No. 08/650,278 filed May 20, 1996, now abandoned.

BACKGROUND OF THE INVENTION

The present invention relates generally to gas turbines, and more particularly to a gas turbine blade composed of two or more components made from different materials.

Gas turbines include, but are not limited to, gas turbine power generation equipment and gas turbine aircraft engines. A gas turbine includes a core engine having a high pressure compressor to compress the air flow entering the core engine, a combustor in which a mixture of fuel and the compressed air is burned to generate a propulsive gas flow, and a high pressure turbine which is rotated by the propulsive gas flow and which is connected by a larger diameter shaft to drive the high pressure compressor. A typical front fan gas turbine aircraft engine adds a low pressure turbine (located aft of the high pressure turbine) which is connected by a smaller diameter coaxial shaft to drive the front fan (located forward of the high pressure compressor) and to drive an optional low pressure compressor (located between the front fan and the high pressure compressor). The low pressure compressor sometimes is called a booster compressor or simply a booster.

The fan and the high and low pressure compressors and turbines have gas turbine blades each including an airfoil portion attached to a shank portion. Rotor blades are those gas turbine blades which are attached to a rotating gas turbine rotor disc. Stator vanes are those gas turbine blades which are attached to a non-rotating gas turbine stator casing. Typically, there are alternating circumferential rows of radially-outwardly extending rotor blades and radially-inwardly extending stator vanes. When present, a first and/or last row of stator vanes (also called inlet and outlet guide vanes) may have their radially-inward ends also attached to a non-rotating gas turbine stator casing. Counterrotating "stator" vanes are also known. Conventional gas turbine blade designs typically have airfoil portions that are made entirely of metal, such as titanium, or are made entirely of a composite. The all-metal blades, including costly wide-chord hollow blades, are heavier in weight which results in lower fuel performance and require sturdier blade attachments, while the lighter all-composite blades are more susceptible to damage from bird ingestion events. Known hybrid blades include a composite blade having an airfoil shape which is covered by a surface cladding (with only the blade tip and the leading and trailing edge portions of the surface cladding comprising a metal) for erosion and bird impact reasons. The fan blades typically are the largest (and therefore the heaviest) blades in a gas turbine aircraft engine, and the front fan blades are the first to be impacted by a bird strike. What is needed is a lighter-weight gas turbine blade, and especially an aircraft-engine gas-turbine fan blade, which is both lighter in weight and better resistant to damage from bird ingestion and blade out events.

SUMMARY OF THE INVENTION

The gas turbine blade of the invention includes a shank portion and an airfoil portion. The airfoil portion has an operating temperature range, a design rotational speed, a blade root attached to the shank portion, a blade tip, and a radial axis extending outward toward the blade tip and inward toward the blade root. The airfoil portion also includes a metallic section and at least one elastomeric section. The metallic section consists essentially of metal, has a first mass density, and radially extends from generally the blade root to generally the blade tip.

The at-least-one elastomeric section consists essentially of elastomer, has a second mass density, is bonded to the metallic section, and is resilient over the operating temperature range. The second mass density is less than the first mass density. Preferably, the metallic section and the at-least-one elastomeric section only together define a generally airfoil shape at the design rotational speed.

Several benefits and advantages are derived from the gas turbine blade of the invention. The metallic section radially extends generally the entire radial length of the blade to provide structural strength while the at-least-one elastomeric section provides lower weight. The lower weight results in better fuel consumption and allows for a less-robust blade attachment. In addition, the at-least-one elastomeric section allows the blade to better survive an impact event, such as a bird strike in an aircraft-engine fan blade, without unwanted separation of the at-least-one elastomeric section from the metallic section.

BRIEF DESCRIPTION OF THE DRAWINGS

The accompanying drawings illustrate a preferred construction of the present invention wherein.

DETAILED DESCRIPTION OF THE INVENTION

Figure 1:
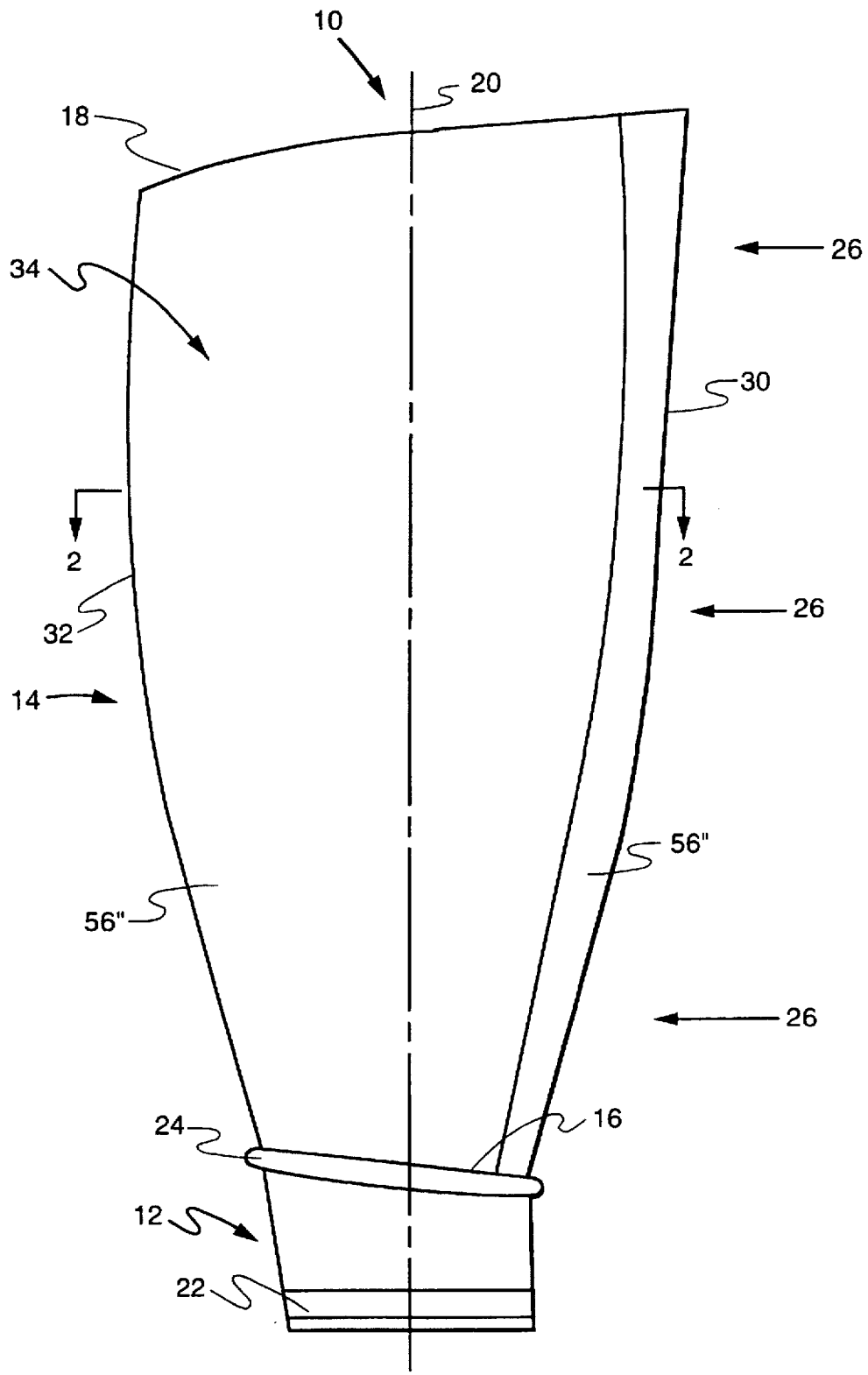
FIG. 1 is a schematic side-elevational view of the pressure side of a preferred construction of the gas turbine blade of the present invention in the form of a gas-turbine aircraft-engine fan blade.
Figure 2:
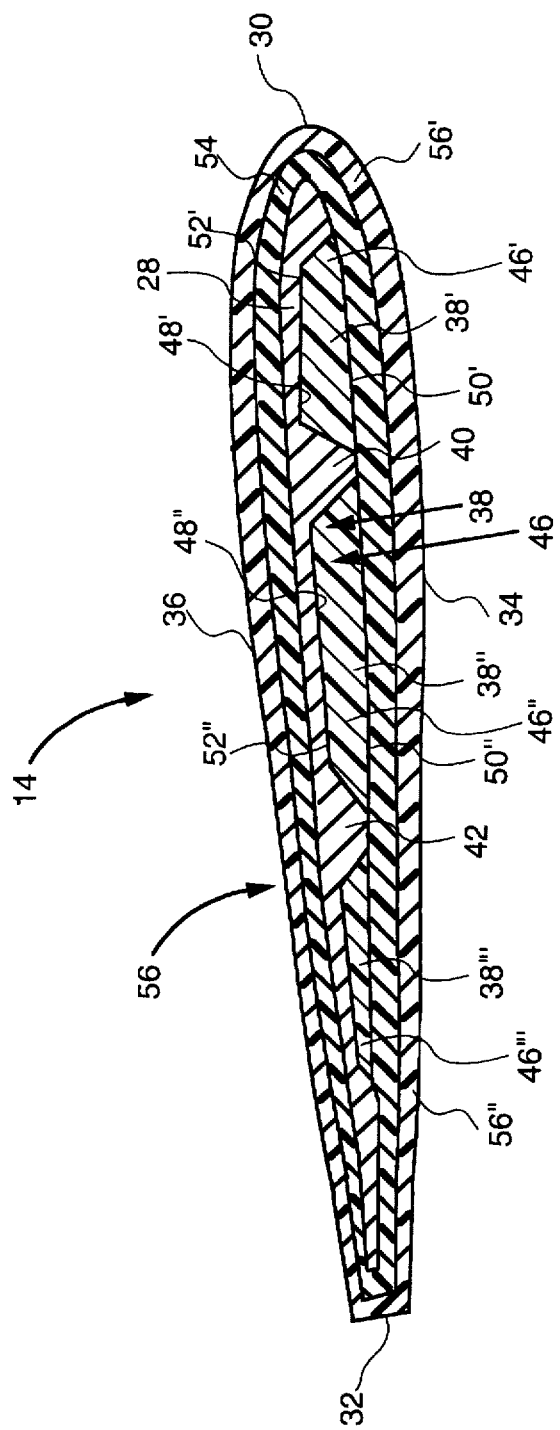
FIG. 2 is a schematic cross-sectional view of the airfoil portion of the gas turbine blade of FIG. 1, taken along lines 2—2 of FIG. 1.
Figure 3:
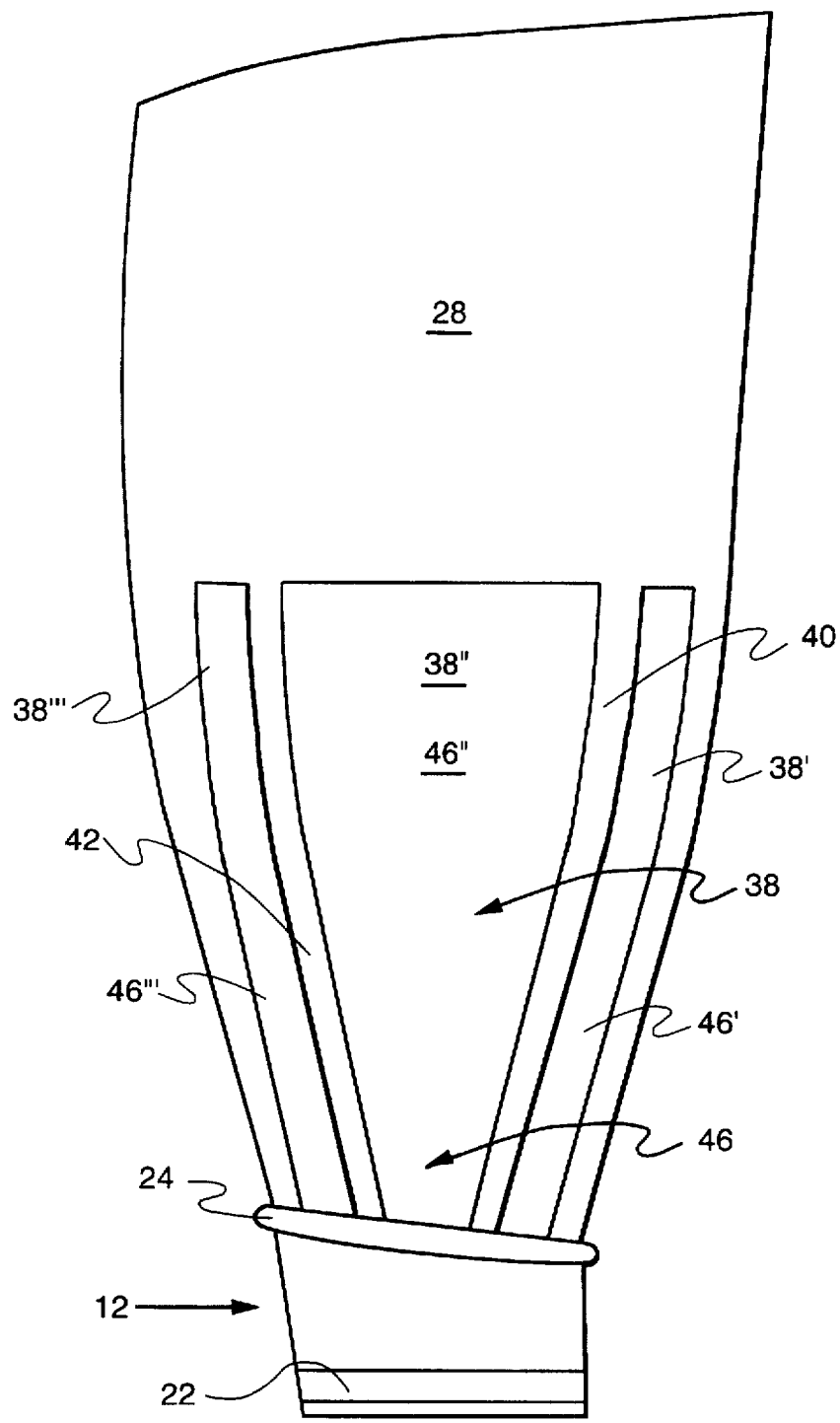
FIG. 3 is a view, as in FIG. 1, of the blade of FIG. 1, but with the preferred erosion coating and the preferred skin removed from the airfoil portion.

Referring now to the drawings, wherein like numerals represent like elements throughout, FIGS. 1 through 3 schematically show a preferred construction of the gas turbine blade 10 of the present invention. In a first embodiment of the invention, the gas turbine blade 10 includes a shank portion 12 and an airfoil portion 14. The airfoil portion 14 has an operating temperature range, a design rotational speed, a blade root 16 attached to the shank portion 12, a blade tip 18, and a radial axis 20 extending outward toward the blade tip 18 and inward toward the blade root 16. The shank portion 12 typically includes a dovetail 22, for attachment of the blade 10 to a rotor disc (not shown), and a blade platform 24, for helping to radially contain the air flow (the air flow direction being indicated by arrows 26 in FIG. 1). The airfoil portion 14 has a leading edge 30 and a trailing edge 32, wherein the air flow direction 26 is generally from the leading edge 30 to the trailing edge 32. The airfoil portion 14 also has a pressure (concave-shaped) side 34 and a suction (convex-shaped) side 36, wherein the gas turbine blade 10 rotates in a direction such that the pressure side 34 passes a reference point before the suction side 36 passes the same reference point.

The airfoil portion 14 also includes a metallic section 28 (seen in FIGS. 2 and 3) consisting essentially of (and preferably consisting of) metal. The term "metal" includes "alloy". It is noted that a "metallic foam", because of its foam cavities (i.e., cells), is not considered to consist essentially of metal for the purpose of describing the invention. Preferably, the metallic section 28 is a monolithic metallic section. In an exemplary embodiment, the metal consists essentially of (and preferably consists of) titanium. Other choices for the metal include, but are not limited to, aluminum, cobalt, nickel, or steel. The metallic section 28 has a first mass density and radially extends from generally the blade root 16 to generally the blade tip 18. Even with lightweight metals, the first mass density of the metallic section 28 typically is greater than generally two grams per cubic centimeter. In an exemplary construction, the metallic section 28 has no surface through-holes and no internal voids.

The airfoil portion 14 additionally includes at least one panel section 38 (seen in FIGS. 2 and 3) not consisting essentially of metal, having a second mass density, and bonded to the metallic section 28. Preferably, the at-least-one panel section 38 comprises spaced-apart first and second panel sections 38' and 38", and the metallic section 28 also includes a rib 40 disposed between, and bonded to, the first and second panel sections 38' and 38". The second mass density is less than the first mass density. Preferably, the second mass density is less than generally 2.0 gram per cubic centimeter. The metallic section 28 and the at-least-one panel section 38 (which in the preferred construction shown in FIGS. 2 and 3 consists of the first, second, and third panel sections 38', 38", and 38'") only together (and not separately) define a generally airfoil shape. The number, shape, and location of the at-least-one panel section 38 is chosen by the artisan. It is noted that the metallic section 28 of the airfoil portion 14 may include additional ribs (such as additional rib 42) for improved stiffness and to act as crack/delamination stoppers, and that the number and orientation of the ribs is left to the artisan. For example, in addition to ribs 40 and 42 which run generally radially, other ribs (not shown) may run generally chordwise or run generally along some arbitrary angle with respect to the radial axis 20.

The choice of material for the at-least-one panel section 38 is unlimited provided such material does not consist essentially of metal, has a lower mass density than that of the metallic section 28, is suitable for use in a particular blade in a particular gas turbine environment, and will not debond from the metallic section 28 of the particular blade during normal operation of the particular gas turbine. Choices for the material for the at-least-one panel section 38 include, without limitation, materials consisting essentially of rigid composites, rigid foams, and mixtures thereof.

The term "composite" is defined to be any material having any (metal or non-metal) fiber filament embedded in any (metal or non-metal) matrix binder, but the term "composite" does not include a metal fiber (i.e., fiber filament) embedded in a metal matrix. Preferably, when the at-least-one panel section 38 is a composite panel section, such composite panel section is a layup of discrete composite laminations. In an exemplary embodiment, the composite material consists essentially of (and preferably consists of) carbon fiber filaments embedded in an epoxy (i.e., epoxy resin) matrix binder. Other choices for the composite material include, but are not limited to, fiber-bismaleimide, fiber-polyimide, and other fiber-epoxy thermoset or thermoplastic resins and mixtures thereof. Fiber-filament modulus and orientation are chosen to maintain overall airfoil-portion stiffness to minimize structural binding of the blade under centrifugal and aerodynamic load, as is within the level of skill of the artisan.

The term "foam" is defined to be any material (including a polymer, ceramic, silicone, metal, and mixtures thereof) having cellular (e.g., honeycomb) structures (regardless of size, shape, uniformity, or content) dispersed generally throughout the material. As previously noted, a "metallic foam", because of its foam cells (i.e., cavities), is not considered to consist essentially of metal for the purpose of describing the invention. In an exemplary embodiment, a polymer foam has irregularly-shaped and preferably generally identically-sized generally $10^{-16}$ cubic-millimeter air-containing cavities. Further examples of foams include structural foams and syntactic foams. The term "structural foam" is defined to be a plastic having a cellular core and integral skin, and the term "syntactic foam" is defined to be a cellular polymer made by dispersing rigid, microscopic particles in a fluid polymer and then curing it. An example of a syntactic foam is Rohacell Foam.

In a favored enablement, the composite or foam material is thermally removable from the metallic section 28 at a temperature below the melting point of the metal of the metallic section 28. This allows the airfoil portion 14 to be easily repaired should it become damaged due to foreign object impacts. If the airfoil portion 14 is damaged in a composite or foam panel section, the composite or foam material would be thermally removed, the metallic section 28 repaired, and new composite or foam material reapplied.

Preferably, the bonding of the at-least-one panel section 38 to the metallic section 28 is accomplished by self adhesion or adhesion between the at-least-one panel section 38 and the metallic section 28. Other examples of bonding include, without limitation, adhesive bonding (adhesive film or paste) and fusion bonding. It is noted that the metallic section 28 has a first volume, the at-least-one panel section 38 has a second volume, and in an exemplary embodiment, the second volume of the at least-one panel section 38 is equal to at least generally twenty percent of the first volume of the metallic section 28. It is further noted that rigid composites and rigid foams are composites and foams which are rigid over the operating temperature range of the airfoil portion 14 of the gas turbine blade 10.

It is noted that the shank portion 12 preferably is a metal shank portion. However, a composite shank portion (suitably bonded or otherwise affixed to the airfoil portion 14) may be employed in particular blade designs. It is noted that the dovetail 22 of the shank portion 12 can be partially composite (not shown) on the pressure (concave) side. Alternatively, the dovetail 22 can have a metal wedge system (also not shown) to positively capture adjoining foam or composite sections and provide a metallic dovetail wear surface.

Surprisingly, a choice for the material for the at-least-one panel section 38 is an elastomer, although this runs counter to the established wisdom in the gas turbine art of requiring the airfoil portion 14 to be made of rigid materials! A simulated large-bird-impact test showed significantly less debonding for an elastomer known as poly (phenyldimethylsiloxane) than for a composite or foam. Thus, an elastomer is a preferred material, and a second preferred embodiment of the invention is identical to the previously-described first preferred embodiment but with the terminology "at least one panel section 38" replaced with "at least one elastomeric section 46", wherein the at-least-one elastomeric section 46 consists essentially of elastomer and is resilient over the operating temperature range, and wherein preferably the metallic section 28 and the at-least-one elastomeric section 46 only together define a generally airfoil shape at the design rotational speed. Usually, the airfoil shape will also exist at zero rotational speed, but particular applications may call for elastomers whose resiliency is such that the airfoil shape will exist only under rotational centrifugal forces, as is within the design capabilities of the artisan.

The term "elastomer" as defined in *Webster's Third New International Dictionary*, means "an elastic rubber-like substance (as a synthetic rubber or a plastic having some of the physical properties as natural rubber)". In an exemplary embodiment, the elastomer consists essentially of, and preferably consists of, poly(phenyldimethylsiloxane). Other choices for the elastomer include, but are not limited to, polyorganosiloxanes like poly(dimethylsiloxanes), poly (halosiloxanes) like poly(fluorosiloxanes), nitrogen and phosphorus containing polymers like polyphosphazenes, poly(arylsiloxanes) like poly(diphenolsiloxanes), as well as any copolymers prepared therefrom. It is noted that the terminology "consisting essentially of an elastomer" includes, without limitation, an elastomer containing elastomer fillers such as, without limitation, calcium carbonate, fumed silica, and quartz. The term "resilient" as defined in *Webster's Third New International Dictionary*, includes "returning freely to a previous position, shape, or condition: as . . . capable of withstanding shock without permanent deformation or rupture . . . " It is preferred that the bonding of the at-least-one elastomeric section 46 to the metallic section 28 is accomplished by self adhesion or adhesion. Other examples of bonding include, without limitation, adhesive bonding (adhesive film or paste) and fusion bonding.

Preferably, the at-least-one elastomeric section 46 has a modulus of elasticity of between generally 250 pounds-per-square-inch (psi) and generally 50,000 pounds-per-square-inch (psi) (and more preferably between generally 250 psi and generally 20,000 psi) over the operating temperature range. An elastomer that is too soft (i.e., having a modulus of elasticity less than generally 250 psi) may not be able to structurally provide an airfoil shape, and an elastomer that is too hard (i.e., having a modulus of elasticity greater than generally 50,000 psi) may not be able to resiliently recover from a heavy bird impact. A more preferred range for the modulus of elasticity for the at-least-one elastomeric section 46 is between generally 500 psi and generally 15,000 psi. In an exemplary enablement, the airfoil portion 14 is an aircraft-engine fan-blade airfoil portion, wherein the operating temperature range includes a flight temperature range, and wherein the at-least-one elastomeric section 46 is resilient over the flight temperature range. A typical operating temperature range is between −100 and 350 degrees Fahrenheit, and a typical flight temperature range is between −15 and 350 degrees Fahrenheit.

The metallic section 28 has a first volume, and the at-least-one elastomeric section 46 has a second volume. Preferably, the second volume is equal to at least generally twenty percent of the first volume. In an exemplary embodiment, the at-least-one elastomeric section 46 comprises spaced-apart first and second elastomeric sections 46' and 46" (and preferably a spaced-apart third elastomeric section 46'"). In a preferred construction, the metallic section 28 includes first and second surface recesses 48' and 48" each having an open top 50' and 50" and a closed bottom 52' and 52". It is preferred that the first and second surface recesses 48' and 48" each face the pressure side 34 of the airfoil portion 14, although one or more may face the suction side 36 in a particular blade application. The first elastomeric section 46' is disposed in the first surface recess 48', and the second elastomeric section 46" is disposed in the second surface recess 48". Preferably, the metallic section 28 includes a rib 40 disposed between, and bonded to, the first and second elastomeric sections 46' and 46", wherein the rib 46 narrows from the closed bottoms 52' and 52" toward the open tops 50' and 50" of the first and second surface recesses 48' and 48". It is noted that a desired location for the at-least-one elastomeric section 46 is toward the blade root 16 and away from the blade tip 18 and the leading and trailing edges 30 and 32. In an exemplary construction, the metallic section 28 has no surface recesses other than those containing elastomeric sections 46.

In a preferred embodiment, the airfoil portion 14 further includes a skin 54 which generally covers and is bonded to the at-least-one elastomeric section 46, wherein the skin 54 has a modulus of elasticity which is at least generally ten times higher than that of the at-least-one elastomeric section 46. Such skin 54 preferably is of composite or metal construction. Preferably, the skin 54 is a layup of discrete composite plies or of a braided construction. In an exemplary embodiment, any skin composite consists essentially of (and preferably consists of) carbon, glass, or aramid filaments embedded in an epoxy (i.e., epoxy resin) matrix binder. Other choices for the composite include, but are not limited to, fiber-bismaleimide, fiber-polyimide, and other fiber-epoxy thermoset or thermoplastic resins and mixtures thereof wherein the fibers are glass, aramid, or graphite and mixtures thereof. Fiber-filament modulus and orientation are chosen to maintain overall airfoil-portion stiffness to minimize structural binding of the blade under centrifugal and aerodynamic load, as is within the level of skill of the artisan. Preferably the bonding of any skin composite is accomplished by use of a separate adhesive film material or resin transfer molding or injection. Other examples of bonding include, without limitation, adhesion between the composite resin itself and the substrate. Typically, the skin 54 is a thin layer and may (as shown in FIG. 2) or may not also cover the metallic section 28. When present, the purpose of the skin 54 is to give a hard face to the at-least-one elastomeric section 46 to spread out the force of any impact.

Preferably, the airfoil portion 14 moreover includes an erosion coating 56 (unless the skin itself provides sufficient erosion resistance) which generally covers and is bonded to the skin 54. In a desired construction, the erosion coating 56 includes a metallic region 56' disposed only at generally the leading edge 30. It is preferred that the erosion coating 56 also include a non-metallic region 56" disposed from the metallic region 56' to generally the trailing edge 32. An example of a material for the non-metallic region 56" is, without limitation, polyurethane, and an example of a material for the metallic region 56' is, without limitation, titanium.

It is noted that the blade design goal is to use the lightest materials possible in a gas turbine blade and, for aircraft-engine blades, to use materials which will be resistant to, and which will not debond because of, bird strikes. It is further noted that the bird impact footprint is primarily over the area of the pressure side 34 near the leading edge 30, followed by the other areas of the pressure side 34. The effected areas of any skin 54 and the at-least-one elastomeric section 46 provide buckling resistance. It is also noted that less containment structure (not shown) for the airfoil portion 14 is required since the at-least-one elastomeric section 46 will not fragment or debond from the metallic section 28 (with or without a skin 54) under moderate impact.

In a favored enablement, the elastomer is mechanically or thermally removable from the metallic section 28 at a temperature below the melting point of the metal material.

This allows the airfoil portion 14 to be easily repairable should it become damaged due to bird strikes or foreign object impacts. If the airfoil portion 14 is damaged in the elastomer areas, the elastomer would be mechanically or thermally removed, the metallic section 28 repaired, and new elastomer reapplied. Since most of such blade damage is to the lead row of gas-turbine aircraft-engine blades 10, it is preferred, as previously noted, that the airfoil portion 14 is an airfoil portion of a gas-turbine aircraft-engine fan blade 10 (or the airfoil portion of a gas-turbine aircraft-engine compressor blade if the engine has no fan).

Preferred methods for making the gas turbine blade 10 of the invention include, but are not limited to, fabricating the metallic section 28, the at-least-one panel section 38 (whether it is the at-least-one elastomeric section 46, or whether it is made of composite, foam, etc.), and the skin 54 separately or as one unit (co-cured) using autoclave, compression mold, or injection molding techniques. If autoclave is chosen, the metallic segment 28 would act as one side of the tool, thus minimizing tooling. Preferably, the skin 54 is built up by manual or machine layering or by braiding around the metallic-section/panel-section assembly, and then is resin transfer molded. It is noted that the metallic section 28 preferably is forged, extruded, or cast, and that the surface recesses 48' and 48" preferably are further machined by chemical milling, electro-chemical machining, water-jet milling, electro-discharge machining, or high speed machining.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

We claim:

1. A gas turbine blade comprising:
   a) a shank portion; and
   b) an airfoil portion having an operating temperature range, a design rotational speed, a blade root attached to said shank portion, a blade tip, and a radial axis extending outward toward said blade tip and inward toward said blade root, and wherein said airfoil portion also includes:
      (1) a metallic section consisting essentially of metal and having a first mass density, wherein said metallic section radially extends from generally said blade root to generally said blade tip; and
      (2) at least one elastomeric section consisting essentially of elastomer, having a second mass density, and bonded to said metallic section, wherein said at least one elastomeric section is resilient over said operating temperature range, and wherein said second mass density is less than said first mass density.

2. The gas turbine blade of claim 1, wherein said metallic section and said at least one elastomeric section only together define a generally airfoil shape at said design rotational speed.

3. The gas turbine blade of claim 2, wherein said at least one elastomeric section has a modulus of elasticity of between generally 250 pounds-per-square-inch and generally 50,000 pounds-per-square-inch over said operating temperature range.

4. The gas turbine blade of claim 3, wherein said metallic section has a first volume and said at least one elastomeric section has a second volume, and wherein said second volume is equal to at least generally twenty percent of said first volume.

5. The gas turbine blade of claim 3, wherein said at least one elastomeric section comprises spaced-apart first and second elastomeric sections.

6. The gas turbine blade of claim 5, wherein said metallic section includes first and second surface recesses each having an open top and a closed bottom, wherein said first elastomeric section is disposed in said first surface recess, and wherein said second elastomeric section is disposed in said second surface recess.

7. The gas turbine blade of claim 6, wherein said airfoil portion has a pressure side and a suction side, and wherein said first and second surface recesses each face said pressure side.

8. The gas turbine blade of claim 6, wherein said metallic section also includes a rib disposed between, and bonded to, said first and second elastomeric sections, and wherein said rib narrows from said closed bottoms toward said open tops of said first and second surface recesses.

9. The gas turbine blade of claim 1, wherein said airfoil portion is an aircraft-engine fan-blade airfoil portion, wherein said operating temperature range includes a flight temperature range, and wherein said at least one elastomeric section is resilient over said flight temperature range.

10. The gas turbine blade of claim 1, wherein said airfoil portion further includes a skin which generally covers and is bonded to said at least one elastomeric section, and wherein said skin has a modulus of elasticity which is at least generally ten times higher than that of said at least one elastomeric section.

11. The gas turbine blade of claim 10, wherein said airfoil portion also includes an erosion coating which generally covers and is bonded to said skin.

* * * * *